(12) United States Patent
Ouellet

(10) Patent No.: US 8,827,309 B1
(45) Date of Patent: Sep. 9, 2014

(54) POWER DRIVE FOR LANDING GEAR

(71) Applicant: Jean-Francois Ouellet, St-Antonin (CA)

(72) Inventor: Jean-Francois Ouellet, St-Antonin (CA)

( * ) Notice: Subject to any disclaimer, the term of this patent is extended or adjusted under 35 U.S.C. 154(b) by 15 days.

(21) Appl. No.: 13/986,226

(22) Filed: Apr. 15, 2013

(51) Int. Cl.
  *B60S 9/02* (2006.01)
  *F16H 19/02* (2006.01)

(52) U.S. Cl.
  CPC ..................................... *F16H 19/02* (2013.01)
  USPC ........................................ 280/763.1; 254/418

(58) Field of Classification Search
  CPC ............... B66F 3/08; B66F 3/10; B66F 3/14; B66F 3/16; B66F 3/18; B66F 3/20; B66F 3/44; B66F 3/46; B60S 9/02; B60S 9/04; B60S 9/06; B60S 9/10; B60S 9/12
  USPC ..................... 280/763.1, 764.1, 765.1, 766.1; 254/418, 419, 421, 422, 424, 425, 427
  See application file for complete search history.

(56) References Cited

U.S. PATENT DOCUMENTS

| | | | |
|---|---|---|---|
| 2,875,980 A | 3/1959 | Grace | |
| 2,895,567 A | 7/1959 | Hall | |
| 3,077,120 A | 2/1963 | Viehweger, Jr. | |
| 3,136,527 A | 6/1964 | Griffis | |
| 3,189,322 A | 6/1965 | Hadek | |
| 3,341,179 A | 9/1967 | Smith | |
| 4,097,840 A | 6/1978 | Chappelle | |
| 4,116,315 A | 9/1978 | Vandenberg | |
| 4,129,322 A | 12/1978 | Kuntz, Jr. | |
| 4,281,852 A | 8/1981 | Konkle | |
| 4,466,637 A | 8/1984 | Nelson | |
| 4,703,917 A | 11/1987 | Tomlinson | |
| 5,299,829 A | 4/1994 | Rivers, Jr. et al. | |
| 5,451,076 A | 9/1995 | Burkhead | |
| 5,862,885 A | 1/1999 | Carmitchel | |
| 6,224,103 B1 | 5/2001 | Hatcher | |
| 6,260,882 B1 | 7/2001 | Kingsbury | |
| 6,896,289 B2 | 5/2005 | Gross | |
| 6,926,305 B2 | 8/2005 | Daniel | |
| 7,163,207 B2 | 1/2007 | Baird et al. | |
| 7,311,331 B2 | 12/2007 | McGlothlin | |
| 7,377,488 B2 | 5/2008 | Schutt | |
| 7,429,061 B2 | 9/2008 | Perkins | |
| 8,051,545 B2 * | 11/2011 | Peveler | 29/428 |

FOREIGN PATENT DOCUMENTS

| | | |
|---|---|---|
| CA | 1072940 | 3/1980 |
| CA | 2039149 | 3/1991 |
| CA | 2339156 | 2/2000 |
| CA | 2531272 | 6/2006 |
| CA | 2621342 | 3/2007 |

* cited by examiner

*Primary Examiner* — John Walters
(74) *Attorney, Agent, or Firm* — Mario Theriault

(57) ABSTRACT

The power drive includes a housing enclosing a gearing system and a motor. The housing is mounted under the floor of a transport trailer. A drive shaft extends outside the housing for connection in series with a cross shaft of the landing gear of the trailer. A gear shift actuator is mounted in the gearing system for engagement or idling of the gearing system. The gear shift actuator comprises a rod that is movable in and out of the driver side of the housing. A handle lock saddle is mounted to the driver side of the housing for retaining a crank handle of the landing gear thereto. The saddle is centered on the rod such that the rod must be pushed inward for mounting the crank handle to the handle lock saddle. The gearing system is inoperable if the crank handle is not securely stowed to the handle lock saddle.

20 Claims, 4 Drawing Sheets

POWER DRIVE FOR LANDING GEAR

The present invention claims the benefit of U.S. Provisional Application No. 61/687,070, filed Apr. 18, 2012.

FIELD OF THE INVENTION

This invention pertains to landing gears for transport trailers, and more particularly it pertains to a retrofit power drive unit for mounting in series with the cross shaft of a landing gear system.

BACKGROUND OF THE INVENTION

Electric, pneumatic and hydraulic drives have been in use for many years to facilitate the operation of landing gears on transport trailers. The following documents provide a good inventory of auxiliary, non-manual drive systems that have been found in the prior art for operating landing gears on transport trailers.

Canadian Patent 1,072,940 issued to Joseph P. Orth et al. on Mar. 4, 1980;
Canadian Patent 2,039,149 issued to R. P. Whittingham on Mar. 14, 1991;
Canadian Patent 2,339,156 issued to J. M. Alguera-Gallego et al. on Apr. 24, 2007;
Canadian Patent 2,531,272 issued to Frank J. Drake, on Mar. 16, 2010;
Canadian Patent Appl. 2,621,342 filed by Giancarlo Brun, on Aug. 14, 2006;
U.S. Pat. No. 2,875,980 issued to K. Grace on Mar. 3, 1959;
U.S. Pat. No. 3,077,120 issued to A. F. Viehweger, jr. on Feb. 12, 1963;
U.S. Pat. No. 3,189,322 issued to C. G. Hadek on Jun. 15, 1965;
U.S. Pat. No. 3,136,527 issued to L. Griffis on Jun. 9, 1964;
U.S. Pat. No. 3,341,179 issued to C. B. Smith on Sep. 12, 1967;
U.S. Pat. No. 4,097,840 issued to Warner A. Chappelle on Jun. 27, 1978;
U.S. Pat. No. 4,116,315 issued to Ervin K. Vandenberg on Sep. 26, 1978;
U.S. Pat. No. 4,129,322 issued to Martin Kuntz, Jr. on Dec. 12, 1978;
U.S. Pat. No. 4,281,852 issued to Raymond L. Konide on Aug. 4, 1981;
U.S. Pat. No. 4,466,637 issued to Carl A. Nelson on Aug. 21, 1984;
U.S. Pat. No. 5,299,829 issued to B. A. Rivers, Jr. et al., on Apr. 5, 1994;
U.S. Pat. No. 5,451,076 issued to Paul Burkhead on Sep. 19, 1995;
U.S. Pat. No. 6,224,103 issued to Edwin B. Hatcher on May 1, 2001;
U.S. Pat. No. 6,260,882 issued to Richard A. Kingsbury on Jul. 17, 2001;
U.S. Pat. No. 6,896,289 issued to Larry A. Gross on May 24, 2005;
U.S. Pat. No. 6,926,305 issued to Jeffrey Daniel on Aug. 9, 2005;
U.S. Pat. No. 7,163,207 issued to Darryl W. Baird et al. on Jan. 16, 2007;
U.S. Pat. No. 7,311,331 issued to Danny McGlothlin on Dec. 25, 2007;
U.S. Pat. No. 7,429,061 issued to John T. Perkins on Sep. 30, 2008.

Although all the power drive systems of the prior art deserve undeniable merits, these systems are not easily deactivated for use of a conventional hand crank in case of a malfunction of the power drive. In many installations in the prior art, the hand crank is no longer needed and is often stowed away and lost. It is believed that there is a need in the trucking industry for a better power drive system that is reliable, safe to operate, and that can be easily converted back to a manual operation when the need occurs.

SUMMARY OF THE INVENTION

In the power drive for landing gear according to the present invention, there is provided; a housing that can be mounted to the floor frame of a transport trailer; a gearing system mounted in that housing and a drive shaft that is included in that gearing system. The drive shaft extends in opposite directions from the housing for connection in series with a cross shaft of the landing gear. The gearing system is operable by an electric motor, although an hydraulic or a pneumatic motor may also be used.

There is also provided a gear shift actuator mounted in the gearing system for engagement of, or for idling the gearing system. The gear shift actuator comprises a rod that protrudes from the housing through the driver side of the housing. This rod is movable in and out of the driver side of the housing. A handle lock saddle is mounted to the driver side of the housing for retaining a crank handle of the landing gear thereto. The lock saddle is centered on the aforesaid protruding rod such that the rod must be pushed inward the driver side of the housing for mounting the crank handle to the handle lock saddle. The gearing system is inoperable if the crank handle is not securely stowed to the handle lock saddle.

On the other hand, when the crank handle is taken out of the handle lock saddle, the gear shift actuator is urged outwardly, causing the idling of the gearing system. The landing gear system can then be operated manually as if the power drive was not present.

In yet another aspect of the present invention, the controls of the landing gear system include switches to prevent the operation of the power drive if the truck is not connected to the trailer or if the cover portion of the housing is not properly mounted in place.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

A preferred embodiment of the present invention is illustrated in the accompanying drawings, in which like numerals denote like parts throughout the several views, and in which.

DESCRIPTION OF THE PREFERRED EMBODIMENT

Figure 1:
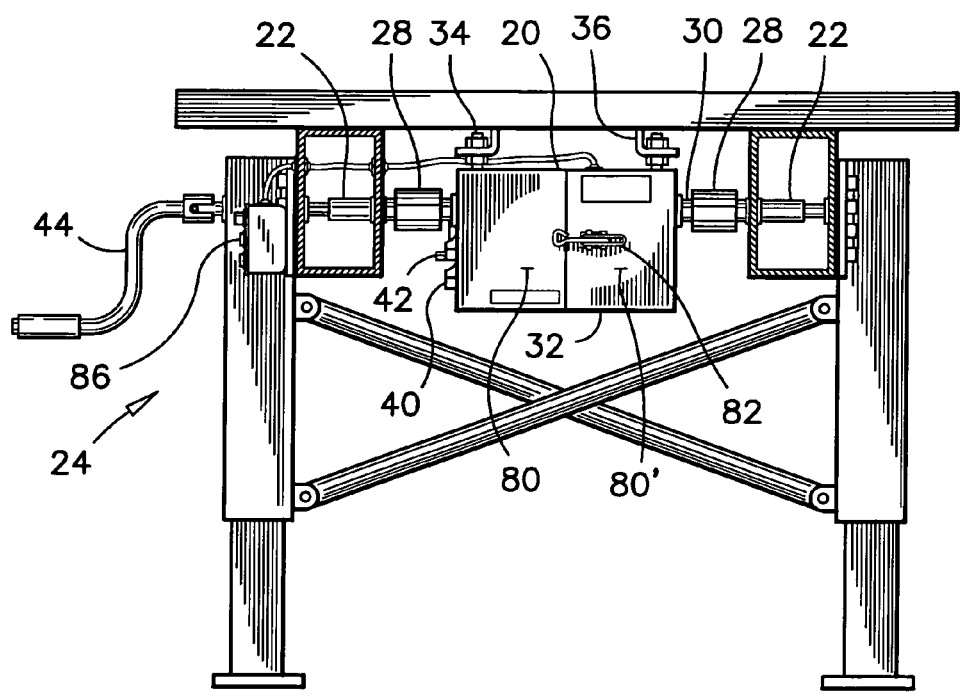
FIG. 1 is a partial cross-section view of a flat bed trailer, showing a preferred installation of the power drive system according to a preferred embodiment of the present invention.

Referring to FIG. 1, the power drive 20 according to the preferred embodiment of the present invention is mounted in series with the cross shaft 22 of the landing gear 24. The landing gear 24 that is of interest herein is the type that has telescoping legs, a screw jack (not shown) in each leg and a right-angle pinion gear set (not shown) in the upper end of each leg. These pinion gear sets are connected to the cross shaft 22 for simultaneous extension or retraction of the legs by rotation of the cross shaft.

During installation of the power drive 20, the existing cross shaft 22 is cut and a central segment is removed. The power drive 20 is fitted to the cross shaft 22 with appropriate couplings 28. For that purpose, the power drive 20 has a drive shaft 30 that is protruding from each side of the housing for connection to the couplings 28 and to the cross shaft 22. The couplings 28 are selected with proper size and torque rating so that the modified cross shaft 22 has a same or better strength than the original cross shaft.

The housing 32 of the power drive 20 has four suspension bolts 34 extending on its upper surface. The floor frame of the trailer is fitted with spaced-apart angle irons 36 with slots (not shown) to receive the suspension bolts 34, and to retain the housing 32 to the floor frame of the trailer and to retain the drive shafts 30 of the power drive 20 in alignment with the cross shaft 22.

The driver side of the housing 32 has a handle lock saddle 40 mounted thereto. A gear shift actuator rod 42 protrudes through the housing 32 at a mid point in the handle lock saddle 40. The gearing system of the power drive 20 is engaged only when the crank handle 44 of the landing gear is stowed and retained to the handle lock saddle 40. The stowing of the crank handle 44 causes the gear shift actuator rod 42 to be pushed in all the way through the lock saddle 40. The operation of the gear shift actuator 42 will be better understood when looking at FIGS. 3 and 4.

Figure 2:
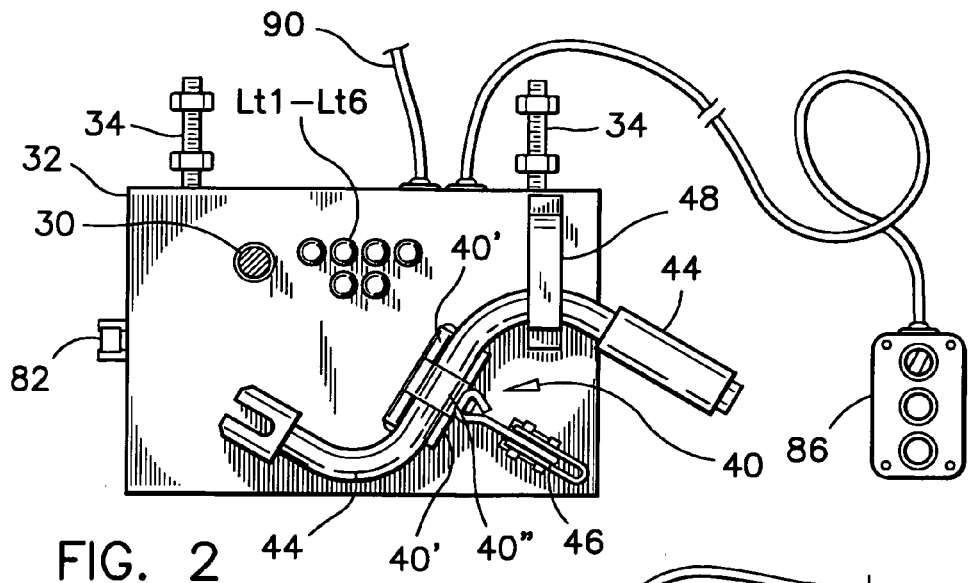
FIG. 2 is a driver side view of the housing of the power drive with a manual crank handle affixed to it.

In FIG. 2, the crank handle 44 is shown as being mounted into the handle lock saddle 40. The handle lock saddle 40 has a cylindrical shape that is made of two curved receiving halves 40'. The curved receiving halves 40' have concave surfaces facing outwardly from the driver side of the housing. The two curved receiving halves 40' are separated by a curved covering piece 40" that is hinged to the two receiving halves 40'. The covering piece 40" has a concave surface facing inward toward the driver side of the housing. The covering piece 40" is movable between the two receiving halves 40' to lie in a coaxial alignment with the two receiving halves 40'. When the central covering piece 40" is swung inward, it forms with the curved receiving halves 40' a cylindrical cavity that is a close fit over the shank of the crank handle 44, for firmly retaining this handle 44 into the lock saddle 40. A first eccentric latch 46 is used to retain the central covering piece 40" in a locked position enclosing the handle 44 into the lock saddle 40. It will be appreciated that although an eccentric latch is illustrated, other latch systems can also be used.

Figure 3:
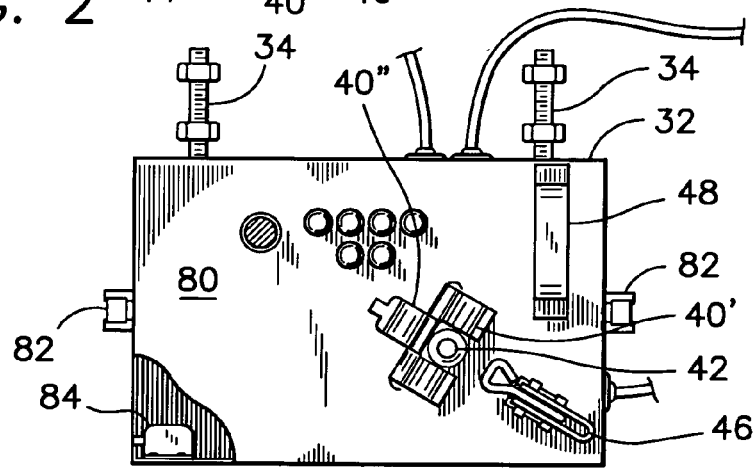
FIG. 3 is another driver side view of the housing of the power drive with the crank handle removed, and showing a cutaway view inside the housing.
Figure 4:
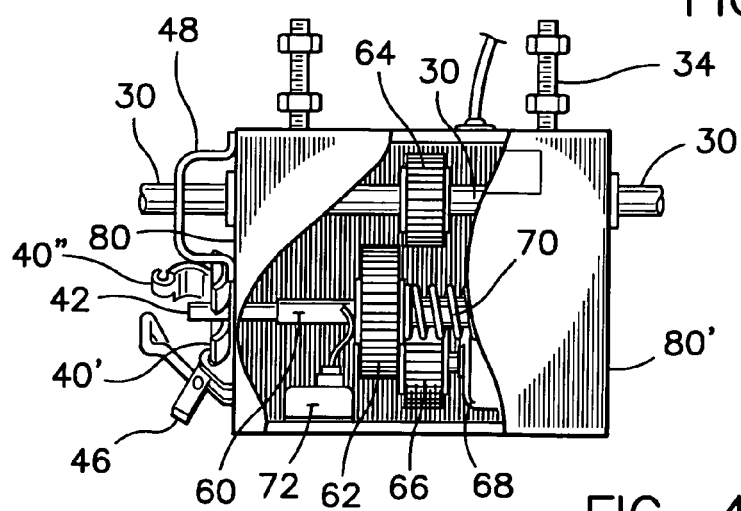
FIG. 4 is a front end view of the housing of the power drive showing another cutaway view inside the housing.

Also in FIGS. 2, 3, 4 a D-ring anchor 48 can be seen. This D-ring anchor 48 is mounted next to handle lock saddle 40 and it is used for retaining the grip end of the crank handle 44 to the housing 32, as may be understood from FIG. 2. Referring now to FIGS. 3 and 4, the handle lock saddle 40 is illustrated in the open position. As mentioned herein before, the gear shift actuator rod 42 protrudes through the driver side wall of the housing 32 at the center of the handle lock saddle 40.

The gear shift actuator rod 42 is an extension of a gear shift shaft 60 on which is mounted an intermediate gear 62. This intermediate gear 62 is movable along the axis of the gear shift shaft 60 to engage with a driven gear 64 on the drive shaft 30 and a drive gear 66 on an electric motor 68. It will be appreciated that the gearing system inside the power drive 20 may be more elaborate than illustrated. The intermediate gear 62 is movable along the axis of shaft 60 and it is normally urged away from an engagement with the drive and driven gears 64, 66 by a spring 70.

As it will be understood, the gear shift actuator rod 42 must be pushed inward to mount the crank handle 44 into the handle lock saddle 40, thereby causing the intermediate gear 62 to engage with both the drive gear 66 and the driven gear 64. For more safety, a limit switch 72 is mounted inside the housing 32 and it is connected to the control circuit of the power drive, which will be described later, to monitor the position of the intermediate gear 62.

The engagement of the intermediate gear 62 and the electric operation of the power drive 20 is only possible when the crank handle 44 is stowed away in the handle lock saddle 40 and the gear shift actuator rod 42 is held inward all the way.

It will be appreciated that the drawing in FIG. 4 has been simplified for clarity. The mechanism to connect the movement of the push rod 42 and the spring 70 to the intermediate gear 62 can be designed in many other arrangements. For example, the movement of the push rod 42 can be used to actuate a fork-type lever as in automotive transmissions. The movement of the push rod 42 can be dampened by an axial damper if the gears do not mesh easily together. The movement of the push rod 42 can also be monitored by a switch, and that switch can be used to energize an electric clutch on the intermediate gear 62 in another example. Therefore, the illustration and description of the mechanism in the preferred embodiment should not be limiting the structure of the power drive of the present invention.

Referring back to FIGS. 1, 2, and 3, the housing 32 is made of two portions 80, 80' that are removable to expose the gearing system and the circuit box inside the housing 32. The removable cover portions 80, 80' are held to the housing 32 by a pair of eccentric clamps 82, one on each side of the housing 32. A second limit switch 84 is positioned inside the housing against one of the removable cover portions 80 and it is connected to the aforesaid control circuit to ensure that the cover portions 80, 80' are in held tightly together before operating the power drive 20.

Figure 5:
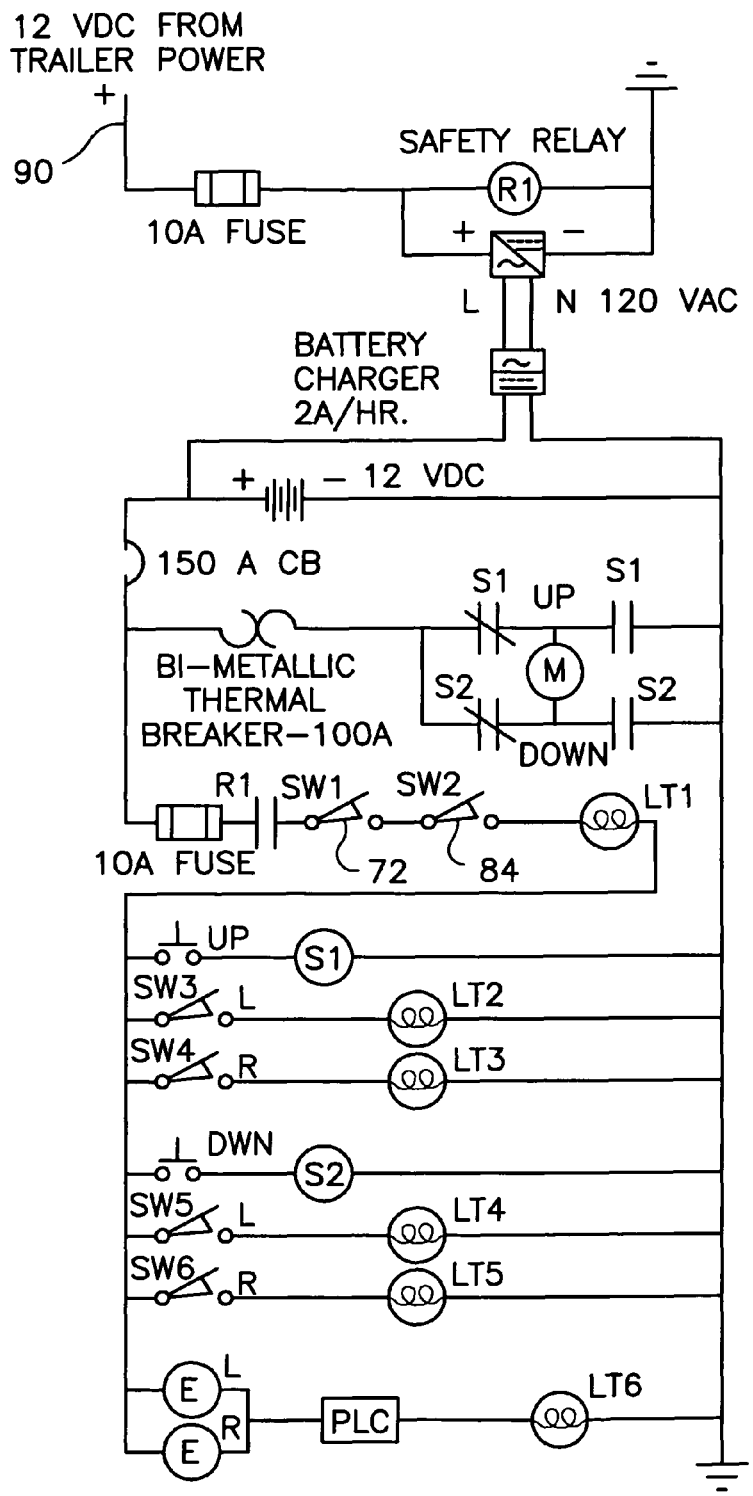
FIG. 5 is a logic diagram of the first preferred control circuit that can be used to operate the preferred power drive.

As seen in FIGS. 1 and 2, a control pendant 86 is provided to operate the control circuit of the power drive from a remote location. The logic diagram for the first preferred control circuit is illustrated in FIG. 5.

The first preferred control circuit of the power drive contains two portions which are both enclosed inside the housing 32. The top portion in the diagram of FIG. 5 contains a 12 volt power cable 90 from the trailer's electrical system; a 10 amp. fuse, an "ON" relay switch R1 and a battery charger. The second circuit portion contains a 12 V battery, a 150 amp. circuit breaker and a 100 amp. bimetallic type circuit breaker controlling a pair of solenoid switches S1 and S2b. The electric motor 68 is operated forward and reverse, (up and down) by the pair of solenoid switches S1 and S2. Push buttons UP and DWN on the pendant 86 are protected by a 10 amp. fuse, and are enabled by the "ON" relay switch R1, and by the limit switches SW1-72 and SW2-84 which were described earlier. Limit switches SW1 and SW2 are preferably moisture-resistant magnetic type switches. Another keylock switch may be incorporated in the pendant 86 for convenience.

A first pilot light Lt1 on the driver side of the housing 32 indicates that the power drive 20 is connected to a source of electrical power. A series of limit switches SW3, SW4, SW5, SW6 are provided in or on the legs of the landing gear and additional visual indicators Lt2, Lt3, Lt4, Lt5 are also provided on the driver side of the housing 32 to indicate the "legs fully up" position and "legs fully down" position Limit switches SW3, SW4, SW5, SW6 are also preferably moisture-resistant magnetic type switches.

A pair of encoders E are also included, one in each leg of the landing gear, to monitor an even raising or an even descending of the legs of the landing gear. The encoders E are connected to a programmable logic controller PLC and to a light Lt6. The light Lt6 indicates an improper operation of the legs, either by a broken cross shaft 22, a damaged coupling 28 or other failure or malfunction of that nature.

Figure 6:
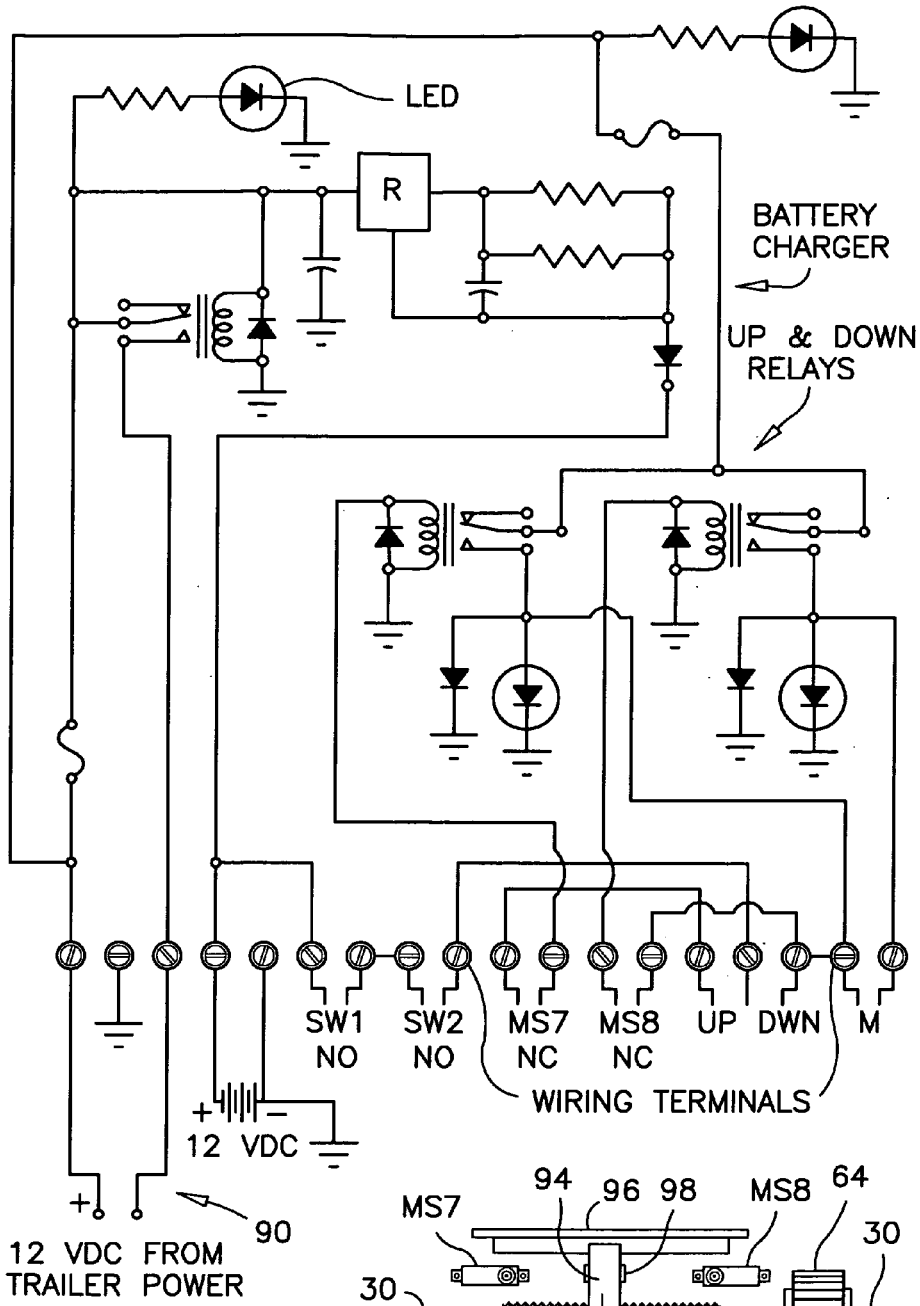
FIG. 6 is a wiring diagram of a second preferred control circuit that can be used to operate the preferred power drive.

An alternate control circuit for operating the power drive is illustrated in FIG. 6. This alternate circuit is preferably included in a printed circuit board that is enclosed inside the housing 32. Again, a schematic illustration of this alternate circuit is illustrated in FIG. 6 to facilitate the understanding of the operation thereof. The actual circuit to be used in a commercial version thereof may contain many more components.

The second preferred circuit contains a battery charger, including a voltage and amperage regulator R, and a pair of relays controlling the forward and reverse rotations of the motor 68. These relays are referred to on the drawing as the up and down relays.

Figure 7:
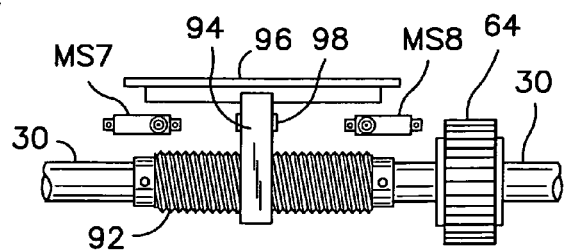
FIG. 7 illustrates an alternate preferred arrangement of a leg displacement monitoring device mounted inside the housing of the preferred power drive.

This second preferred circuit is different from the first one illustrated in FIG. 5, basically, in the fact that the limit switches SW3, SW4, SW5, and SW6 for the legs up or down signals have been eliminated. In the second preferred circuit, the monitoring of the leg movements is effected by a leg displacement monitoring device which is partly illustrated in FIG. 7. The leg movement monitoring device is made of a threaded sleeve 92 that is affixed over to the drive shaft 30, for rotation with the drive shaft. A threaded follower block 94 is mounted to the threaded sleeve 92 for movement along the threaded sleeve 92. The follower block 94 is guided against a guide rail 96 for movement along the drive shaft 30. When the drive shaft 30 rotates, the follower block 94 moves sideways a displacement that is proportional to the extent of extension or retraction of the legs of the landing gear. The follower block 94 has a pair of magnets 98 thereon. The end-of-travel limits of the follower block 98 are monitored by a pair of magnetic switches MS7 and MS8.

The magnetic switches MS7 and MS8 are located along the guide rail 100 and are spaced apart a distance that corresponds to the limits of the legs up and legs down movements. These switches are connected to the printed circuit board in a "normally closed" NC state in order to de-energize the electric motor M at the limits of the leg displacements.

It will be appreciated that the features in one preferred circuit can be used in the other one. For example, the leg displacement monitoring device as partly illustrated in FIG. 7 can be used with the first preferred circuit illustrated in FIG. 5, and the encoders on the legs of the landing gear can be used with the circuit board as illustrated in FIG. 6. Also, the safety relay R1 in the first preferred diagram, or the pendant 86 can also be incorporated in the circuit shown in FIG. 6.

As to other details and manner of operation of the power drive according to the present invention, the same should be apparent from the above description and drawings, and accordingly further discussion related to these aspects is deemed unnecessary.

The power drive system according to the preferred embodiment of the present invention has been illustrated herein in a schematic manner for clarity. Many components of this system were not illustrated to facilitate the understanding of the basic concept of this invention. The components that were not illustrated are those for which the nature, the mounting and functions would be obvious to the persons skilled in the art of electronics and machine design in general. Similarly, the physical dimensions, material types and manufacturing tolerances are not provided because these details are considered obvious to the skilled artisan.

What is claimed is:

1. A power drive for a transport trailer landing gear system comprising:
   a housing; a gearing system including a motor, mounted in said housing, and a drive shaft mounted to said gearing system and extending through the sides of said housing in opposite directions for connection in series with a cross shaft of a landing gear system;
   a gear shift actuator mounted in said gearing system for selective engagement or idling of said gearing system; said gear shift actuator comprising a rod protruding through a driver side of said housing and being movable in and out of said driver side;
   a handle lock saddle mounted to said driver side of said housing for retaining a crank handle of a landing gear system in a stowed position to said driver side of said housing; said handle lock saddle being positioned on said driver side of said housing such that said rod is protruding through a mid-point thereof, and such that a crank handle is mountable in said handle lock saddle by moving said rod inward relative to said driver side.

2. The power drive as claimed in claim 1, wherein said gearing system comprises a driven gear on said drive shaft; a drive gear on said motor, and an intermediate gear on said gear shift actuator, and said intermediate gear being movable with said rod between a first position being engaged with said drive gear and said driven gear, and a second position being disengaged from said driven gear and said drive gear.

3. The power drive as claimed in claim 1, wherein said gear shift actuator is a longitudinal shaft and said intermediate gear is movable along an axis of said longitudinal shaft.

4. The power drive as claimed in claim 1, wherein said rod is urged toward said driver side by a spring.

5. The power drive as claimed in claim 3, further comprising a first limit switch mounted in said housing for monitoring a position of said intermediate gear.

6. The power drive as claimed in claim 1, wherein said drive shaft has a threaded sleeve mounted thereon and a threaded block mounted on said threaded sleeve; said housing has a rail attached thereto for guiding said threaded block along a path parallel to said drive shaft when said drive shaft is rotating; said housing also including a pair of limit switches mounted thereto for monitoring end-of-travel positions of said threaded block along said threaded sleeve.

7. The power drive as claimed in claim 6, wherein a displacement of said threaded block between said limit switches is proportional to an extension or retraction of the legs in a landing gear.

8. The power drive as claimed in claim 1, further comprising a battery mounted in said housing for operating said motor.

9. The power drive as claimed in claim 1, wherein said housing further has suspension bolts extending from an upper surface thereof for retaining said housing to the floor frame of a transport trailer.

10. The power drive as claimed in claim 1, wherein said handle lock saddle comprises two spaced apart curved receiving halves each having a concave curvature facing outward from said driver side of said housing, and one curved covering piece having a concave curvature facing inward toward said driver side of said housing, said curved covering piece being mounted between said curved receiving halves and being hinged to said curved receiving halves for movement into a coaxial alignment with said curved receiving halves and for selectively forming with said curved receiving halves a cylindrical cavity having a close fit dimension over, a shank portion of a crank handle.

11. The power drive as claimed in claim 10, wherein said housing also has a D-ring anchor mounted on said driver side thereof, for receiving a grip portion of a crank handle.

12. A power drive for operating a transport trailer landing gear system comprising:
a housing; a gearing system including a motor, mounted in said housing and a drive shaft mounted to said gearing system and extending through the walls of said housing in opposite directions for connection in series with a cross shaft of a landing gear system
a gear shift actuator mounted in said gearing system for selective engagement or idling of said gearing system; said gear shift actuator comprising a rod protruding through a driver side of said housing and being movable in and out of said driver side; said rod being urged toward said driver side by a spring;
a handle lock saddle mounted to said driver side of said housing for retaining a crank handle of a landing gear system in a stowed position to said driver side of said housing; said handle lock saddle being positioned on said driver side of said housing such that said rod is protruding through a mid-point thereof, and such that a crank handle is mountable to said handle lock saddle by moving said rod inward relative to said driver side;
said handle lock saddle comprising two spaced apart curved receiving halves each having a concave curvature facing outward from said driver side of said housing, and one curved covering piece having a concave curvature facing inward toward said driver side of said housing, said curved covering piece being mounted between said curved receiving halves and being hinged to said curved receiving halves for movement into a coaxial alignment with said curved receiving halves, and for selectively forming with said curved receiving halves a cylindrical cavity having a close fit dimension over a shank portion of a crank handle.

13. The power drive as claimed in claim 12, wherein said gearing system comprises a driven gear on said drive shaft; a drive gear on said motor, and an intermediate gear on said gear shift actuator, and said intermediate gear being movable with said rod between a first position being engaged with said drive gear and said driven gear, and a second position being disengaged from said driven gear and said drive gear.

14. The power drive as claimed in claim 12, wherein said gear shift actuator is a longitudinal shaft and said intermediate gear is movable along an axis of said longitudinal shaft.

15. A landing gear system on a transport trailer, including:
a pair of telescopic legs; a cross shaft extending between said telescoping legs, and a power drive connected in series with said cross shaft for operating said telescoping legs; said power drive comprising;
a housing; a gearing system including a motor mounted in said housing and a drive shaft mounted to said gearing system and extending through the side walls of said housing in opposite directions, said housing having suspension bolts on a top portion thereof; said suspension bolts being affixed to the floor frame of said transport trailer, and said drive shaft being connected in series with said cross shaft;
a gear shift actuator mounted in said gearing system for selective engagement or idling of said gearing system; said gear shift actuator comprising a rod protruding through a driver side of said housing and being movable in and out of said driver side;
a handle lock saddle mounted to said driver side of said housing for retaining a crank handle of said landing gear system in a stowed position to said driver side of said housing; said handle lock saddle being positioned on said driver side of said housing such that said rod is protruding through a mid-point thereof, and such that a crank handle is mountable to said handle lock saddle by moving said rod inward relative to said driver side.

16. The landing gear system as claimed in claim 15, wherein said gearing system comprises a driven gear on said drive shaft; a drive gear on said motor, and an intermediate gear on said gear shift actuator, and said intermediate gear being movable with said rod between a first position being engaged with said drive gear and said driven gear, and a second position being disengaged from said driven gear and said drive gear.

17. The landing gear system as claimed in claim 15, further comprising limit switches on said landing gear for indicating fully up position and fully down position of each of said legs of said landing gear.

18. The landing gear system as claimed in claim 17, further comprising pilot lights on said driver side of said housing for indicating said positions of the legs of said landing gear.

19. The landing gear system as claimed in claim 15, further comprising an encoder on each of said legs of said landing gear for monitoring an even displacement of said legs of said landing gear when said power drive is operating.

20. The landing gear system as claimed in claim 15, further comprising a pendant connected to said housing by a cable, for operation of said power drive from a remote location.

* * * * *